(12) United States Patent
Inaba

(10) Patent No.: US 8,451,326 B2
(45) Date of Patent: May 28, 2013

(54) THREE-DIMENSIONAL TELEVISION SYSTEM, AND THREE-DIMENSIONAL TELEVISION RECEIVER

(76) Inventor: Minoru Inaba, Tochigi-ken (JP)

(*) Notice: Subject to any disclaimer, the term of this patent is extended or adjusted under 35 U.S.C. 154(b) by 644 days.

(21) Appl. No.: 12/452,096

(22) PCT Filed: Oct. 22, 2007

(86) PCT No.: PCT/JP2007/070970
§ 371 (c)(1),
(2), (4) Date: Dec. 15, 2009

(87) PCT Pub. No.: WO2009/004742
PCT Pub. Date: Jan. 8, 2009

(65) Prior Publication Data
US 2010/0134602 A1    Jun. 3, 2010

(30) Foreign Application Priority Data
Jul. 4, 2007  (JP) .................................. 2007-176373

(51) Int. Cl.
*H04N 13/04* (2006.01)
(52) U.S. Cl.
USPC .......................................................... 348/58

(58) Field of Classification Search
USPC ................................ 348/42–58; 359/462–477
See application file for complete search history.

(56) References Cited

U.S. PATENT DOCUMENTS

| 5,119,189 | A | | 6/1992 | Iwamoto et al. ................ 358/88 |
| 5,162,897 | A | | 11/1992 | Jitsukata et al. .................. 358/3 |
| 5,615,046 | A | * | 3/1997 | Gilchrist ....................... 359/464 |
| 7,493,037 | B2 | | 2/2009 | Inaba ........................... 396/324 |
| 2008/0049100 | A1 | * | 2/2008 | Lipton et al. .................... 348/43 |

FOREIGN PATENT DOCUMENTS

| JP | 08-275207 | 10/1996 |
| JP | 2003-107603 | 4/2003 |

* cited by examiner

*Primary Examiner* — Chirag R Patel
(74) *Attorney, Agent, or Firm* — Fattibene and Fattibene LLC; Paul A. Fattibene

(57) ABSTRACT

The present invention realizes stereoscopic television broadcasting which can reproduce a stereoscopic image best in state of stereoscopic viewing and a receiver for the stereoscopic television broadcasting.

In stereoscopic television broadcasting, a reference size of a display of a receiver is determined, images for right and left are displayed on the display with a reference size in a superimposing manner, and transmission is performed such that a distance between the same corresponding points of an infinite subject image is reproduced and displayed to be equal to an interpupillary distance of a human.

3 Claims, 8 Drawing Sheets

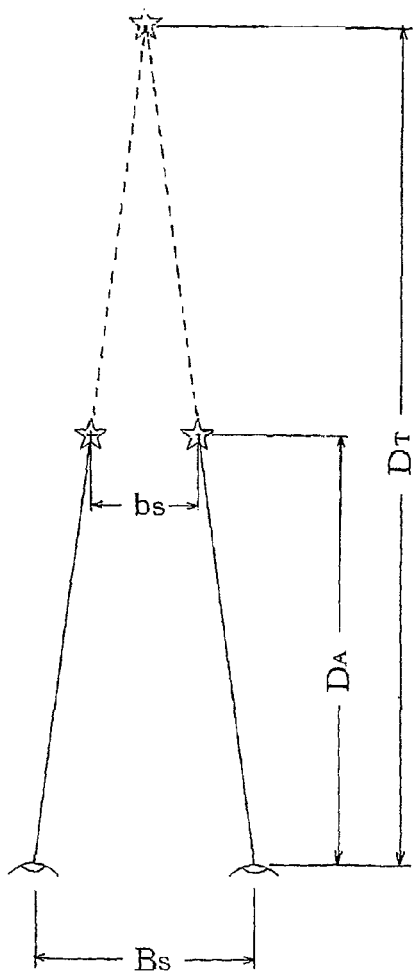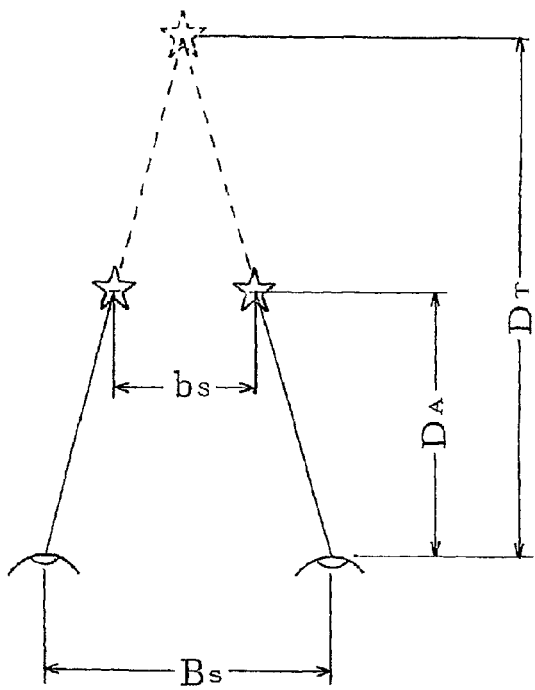
FIG. 8B
FIG. 8A

THREE-DIMENSIONAL TELEVISION SYSTEM, AND THREE-DIMENSIONAL TELEVISION RECEIVER

TECHNICAL FIELD

The present invention relates to a system for a stereoscopic television for recording, reproducing, and displaying stereoscopic images photographed by a stereoscopic video camera, a stereoscopic television receiver and glasses for stereoscopic image viewing, and it has been especially proposed for realizing stereoscopic television broadcasting.

BACKGROUND ART

Conventionally, a stereoscopic photograph obtained by viewing two photographs photographed from two points separated right and left separately with right and left eyes of a viewer has existed for many years. Techniques for an electronic imaging device, an electronic display, a digital signal processing, or the like have greatly developed recently, thereby making photographing, recording, transmitting and displaying of electronic stereoscopic images easy, so that implementation of stereoscopic television broadcasting has become more likely.

Various systems have been proposed for stereoscopic displaying performed by an electronic display, but two eyes stereoscopic viewing (a system where a pair of images for right and left are displayed in a superimposing manner (3D) by utilizing linear polarized lights orthogonal to each other regarding right and left or circularly-polarized lights opposed to each other regarding a rotating direction, and the right and left images are viewed separately using linearly-polarizing glasses for linear polarized lights orthogonal to each other regarding right and left or circularly-polarizing glasses for circularly-polarized lights opposed to each other regarding a rotating direction) is most realistic.

In the two eyes stereoscopic viewing, however, such a fact is described in paragraph [0009] in Patent Document 1 described below that it is difficult to optimally adjust a stereoscopic viewing state (a fused state of right and left images). Further, the following descriptions are included in paragraphs [0067] and [0068] in the Patent Document 1.

In the paragraph [0067], there is a description "... a case that an image is seen on a small screen 15A is different in projecting amount and depth amount from the same image is seen on a large screen 15C ...".

In the paragraph [0068], there is a description "in view of these circumstances, assuming a stereoscopic display device finally utilized, an index is provided so that confirmation can be made at a display section 9 in order that a projecting amount and a depth amount do not exceed a limit projecting amount and a limit depth amount of the stereoscopic display device. The index can be formed utilizing an actual body or it may be formed utilizing a stereoscopic image. In the stereoscopic display device assumed, data for a typical stereoscopic display device may be used, or data may be selected or set by a user.

[Patent Document 1] Japanese Unexamined Patent Application Publication No. 2003-264851

If the stereoscopic camera disclosed in Patent Document 1 is used for photographing in reproduction of a stereoscopic image, adjustment limit points must be set to both of a distant view and a near view (see paragraphs [0070] to [0072] in Patent Document 1), but Patent Document 1 does not include any description about a principle of setting limit points for the distant view and the near view and a reference for the setting. Accordingly, respective photographing must depend on individual photographer intuition, therefore each photographer is required to have high-level skill. From the description "... in the stereoscopic display device assumed, data for a typical stereoscopic display device may be used, ..." in the patent document 1, the stereoscopic image data obtained by such photographing is thought to act on only a specified display at a viewing time effectively. It is impossible to use such a stereoscopic camera in a versatile manner.

In most of "stereoscopic televisions" actually used at an exhibition or the like, such a case often occurs that an infinite subject image such as a far mountain only appears within about one meter positioned from a display surface of a display in a depth direction. That is, in such a stereoscopic television, an object which should originally appear at an infinite position appear at a position within about one meter (several tens centimeters in some cases) from a display screen of the stereoscopic television in a depth direction, and all the other objects appear before the object. As a result, a viewer feels as if he/she was seeing a miniature set.

As shown in FIG. 8A, assuming that a distance between both eyes of a human (or an interpupillary distance) is represented as Bs and a viewer watches a stereoscopic television where a distance between right and left images of an infinite subject is displayed as a distance of the illustrated bs=Bs/2 from a position spaced from the stereoscopic television by 2 meters, an infinite stereoscopic image in a stereoscopic viewing appears at a position spaced from the viewer by 4 meters, because, when a viewing distance is represented as $D_A$ and a distance feeling on a stereoscopic viewing field is represented as $D_T$, $D_T=2000/(1-32.5/65)=4000$ mm is obtained from a relationship of $D_T=D_A/(1-bs/Bs)$.

FIG. 8B represents a state that a viewer watches the stereoscopic television illustrated in FIG. 8A from a viewing distance of 1 meter, where the distance feeling of an infinite stereoscopic image according to FIG. 8B appears at a distance of DT=1000/(1-32.5/65)=2000 mm, namely, 2 meters. When a stereoscopic image set to be narrower than an interpupillary distance of a human is viewed, the phenomenon described above occurs necessarily.

Therefore, it is required that a viewer can obtain a natural depth feeling close to the reality and an infinite distance feeling or the farthest distance feeling within a display screen appears naturally even if a viewing distance varies. It is necessary to avoid such a feeling that a viewer sees a miniature set. An object of the present invention is to solve these problems to realize stereoscopic television broadcasting.

DISCLOSURE OF THE INVENTION

The present invention has been proposed in order to achieve the abovementioned object and it is to provide a stereoscopic television transmission system which is configured in a stereoscopic television broadcasting of a two eyes stereoscopic viewing system where two images for right and left photographed from two points separated right and left are viewed while separated for respective right and left eyes of a human such that a display width size of a receiver is determined to be a constant reference size, screen width centers for the right and left eyes are displayed at the same, or one, position in a horizontal direction on one display in a superimposing manner, and a distance between the right and the left of the same corresponding points on an infinite subject image is reproduced to be a distance equal to an interpupillary distance of a human.

According to this configuration, it is necessary to reproduce a transmitted signal on the side of the receiver faithfully in order to embody stereoscopic television broadcasting, and sizes of right and left screens and a distance between the right and left screens are especially critical issues in the stereoscopic television broadcasting. The invention described in one embodiment has been proposed in order to solve the abovementioned problem, where when a reference size of a display of a receiver is determined and images for right and left are displayed at the same, or one, position on the display of the receiver in an superimposing manner, a transmission and reception system is determined such that a distance between the same corresponding points of the right and left images of an infinite subject is displayed to be equal to an interpupillary distance of a human.

The invention in another embodiment is to provide a stereoscopic television receiver of a two eyes stereoscopic viewing system where images for right and left are viewed while separated for respective right and left eyes of a human, wherein images for right and left are displayed at the same, or one, position on a display with a reference size in a superimposing manner and a distance between the right and the left of the same corresponding points on an infinite subject image is displayed to be equal to an interpupillary distance of a human.

According to this configuration, a state of an optimal stereoscopic effect can be reproduced by displaying images for right and left in such a superimposing manner that the centers of the images coincide with each other and displaying a distance between the same corresponding points of right and left images of a subject positioned at an infinite distance to be equal to an interpupillary distance of a human.

The invention in another embodiment is to provide a stereoscopic television receiver wherein a display with a width narrower than that of a display with a reference size is used, black non-display portions are provided on a right end portion of a display screen for left and a left end portion of a display screen for right, respectively, and displaying is performed such that widthwise centers of the display screens for right and left are displaced on the display in directions away from each other, so that a right viewing field and a left viewing field are caused to coincide with each other at a position far from a surface of the display and a distance between the right and the left of the same corresponding points on an infinite subject image is displayed to be equal to an interpupillary distance of a human.

According to this configuration, the invention in another embodiment is applied to a stereoscopic television using a display with a width narrower than the reference size, whereby one portions (end portions) of the respective display screens for right and left are concealed (displayed in black), display is performed such that the centers of the display screens for right and left are separated from each other, the right and left viewing fields are caused to coincide with each other behind the position of the display, and display is simultaneously performed such that a distance between the same corresponding points of the right and left images of an infinite subject is equal to an interpupillary distance of a human, so that, though a viewer watches a television with a small screen size, an effect equivalent to a state that he/she watches a stereoscopic television having a display with the reference size from the recommended viewing distance can be obtained.

The invention in another embodiment is to provide a stereoscopic television receiver wherein a display with a width wider than that of a display with a reference size is used, black non-display portions are provided on a left end portion of a display screen for a right and left end portion of a display screen for right, respectively, and displaying is performed such that widthwise centers of the display screens for right and left are displaced on the display in directions in which the centers come close to each other and further in directions in which the centers switch positions with each other so that a right viewing field and a left viewing field are caused to coincide with each other at a position before the display and a distance between the right and the left of the same corresponding points on an infinite subject image is displayed to be equal to an interpupillary distance of a human.

According to the configuration, the invention in another embodiment is applied to a stereoscopic television using a display with a width wider than the reference size, where portions (end portions) of the respective screens for the right and the left are concealed (displayed in black) symmetrically so that display is performed such that the widthwise centers of the respective display screens for right and left are moved in directions of coming close to each other until they switch positions with each other (the center of the screen for left is moved rightward while the center of the screen for right is moved leftward), thereby causing the right and left viewing field to coincide with each other before the display, and simultaneously the distance between the right and the left of the corresponding point on an infinite subject image is displayed to be equal to an interpupillary distance of a human so that an effect similar to a state that a viewer watches a stereoscopic television having a display with a reference size from a recommended viewing distance. This invention is configured such that a viewer watches a stereoscopic television from a distance farther than the recommended viewing distance applied when a viewer watches a stereoscopic television with a reference size, and a characteristic thereof lies in that a space between a television and a viewer can be set largely. Accordingly, the present invention in this embodiment is effective when many persons or viewers watch television at the same time.

The invention described in another embodiment is to provide glasses for separately viewing images for the right and the left of a stereoscopic television of a system where display is performed in a time-division manner on a display of a stereoscopic television using LCD in one of the other embodiments, wherein polarizing plates are attached to the right and the left of the glasses, liquid crystal plates are provided in front of the polarizing plates on the right and the left of the glasses, respectively, so that the right and left viewing fields are separated and stereoscopically viewed by alternately driving the respective right and left liquid crystal plates in synchronism with infrared signals emitted from a receiver, and further an inclination angle sensor is attached to the glasses so that correction is made such that a shielding state at a field closing time always becomes maximum by detecting an inclination angle to the horizontal direction at a viewing time to control an application voltage to a liquid crystal at the field closing time according to an inclination of the glasses.

According to the configuration, especially, in glasses for field separation for separating images for right and left of a stereoscopic image of a system performing display on an LCD panel in a time-division manner, where polarizing directions of light beams passing through the right and left liquid crystal plates of the glasses are arranged so as to be orthogonal to each other in time sequence by alternately applying a voltage to the right and left liquid crystal plates provided on the front face of the glasses and polarized lights orthogonal to each other are detected by the polarizing plates disposed behind the liquid crystal plates of the glasses so that even if a viewer inclines his/her glasses (head), the inclination angle is detected by the inclination angle sensor provided on the glasses and a voltage applied to the liquid crystal plates is controlled to prevent crosstalk.

When a distance between the same corresponding points of right and left images of an infinite subject is displayed to be equal to an interpupillary distance of a human in a stereoscopic television, an infinite image is prevented from appearing at a position at a near distance and a distance feeling of the infinite image is prevented from collapsing even if a viewing distance varies.

In stereoscopic television broadcasting, when the reference size of the display is determined and transmission is performed such that display positions of right and left screens on a display with a reference size coincide with each other, it is easy to display a distance between the same corresponding points of right and left images of an infinite subject to be equal to an interpupillary distance size of a human (perform infinite reference display) regardless of a display size on the receiving side, and even if displays having various sizes from a large size to a small size are used as display elements for stereoscopic televisions in a mixing manner, confusing does not occur. There is an optimal viewing distance (recommended viewing distance) for stereoscopic image which displays a distance between right and left images of an infinite subject to be equal to an interpupillary distance of a human but, in fact, a viewer does not feel anything wrong so much even if the viewing distance is varied.

In two eyes stereoscopic viewing, recently, a circularly-polarizing filter is frequently used for the polarizing glasses for separating right and left viewing fields in order to prevent crosstalk. A problem of the circularly-polarizing plate lies in its high price. Further, because a quarter wavelength plate is used, bias occurs in wavelength of light passing through the plate. Recently, a television of an LCD system has been screen-enlarged and has been subjected to high definition. Since light beam emitted from an LCD panel is polarized light (linearly-polarized light), separation of right and left viewing fields can be made relatively easy by utilizing the polarized light. However, crosstalk may occur in the linearly-polarized light when the glasses are inclined to the display. This problem can be easily solved by attaching an inclination angle sensor to the glasses and controlling a voltage to be applied to liquid crystal plates arranged on the front face of the polarizing glasses.

BRIEF DESCRIPTION OF THE DRAWINGS

FIGS. 8A and 8B are state explanatory diagrams of stereoscopic views of a conventional stereoscopic television.

BEST MODE FOR CARRYING OUT THE INVENTION

The present invention is realized by providing a stereoscopic television transmission system which is configured in a stereoscopic television broadcasting of a two eyes stereoscopic viewing system where two images for right and left photographed from two points separated right and left are viewed while separated for respective right and left eyes of a human, a display width size of a receiver is determined to be a constant reference size, screen width centers for respective right and left are displayed at the same, or one, position in a horizontal direction on one display in a superimposing manner, and a distance between the right and the left of the same corresponding points on an infinite subject image is reproduced to be a distance equal to an interpupillary distance of a human in order to achieve the object that a natural depth feeling close to reality can be obtained and an infinite distance feeling or the farthest distance feeling within a display screen appears naturally even if a viewing distance varies.

Figure 1:
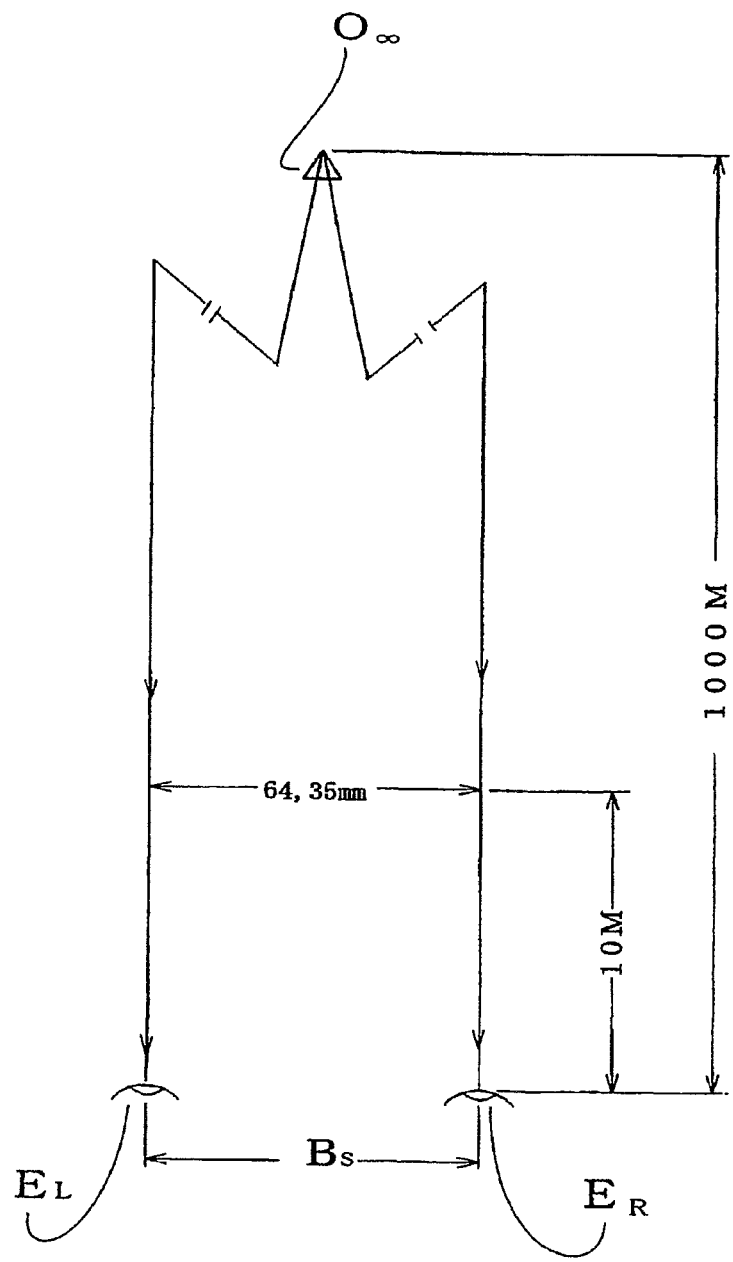
FIG. 1 is an explanatory diagram of a state where a human is seeing an actual scene or the like with his/her eyes.

A fundamental principle of the present invention is shown in FIG. 1. As shown in FIG. 1, light beams which are emitted from the same, or one, point on an object $O_\infty$ positioned at an infinite distance to enter a left eye $E_L$ and a right eye $E_R$ of a human become parallel to each other. When light beams emitted from an object positioned in a near distance enter the right and left eyes, they are separated from each other (the object at a near distance and light beams emitted from the object are omitted in FIG. 1). In FIG. 1, when an interpupillary distance of a human is defined as Bs=65 mm and an infinite object distance is defined as 1000 meters (this distance is actually a finite distance but such a case arises in photographing that a distance of several tens meters is also displayed as an infinite distance), light beams from the same, or one, point on an object enter the right and left eyes while they are separated to each other by 65 mm. Light beams separated by a distance of Bs=65 mm at a viewing point position are spaced to have a distance of 65×(1000−10)/1000=64.35 mm therebetween, for example, even at a position where the viewing point position has come close to an object by 10 meters, therefore, the distance is not so different from an interpupillary distance of a human. That is, eyes of a human always see an object positioned at an infinite distance parallel. Therefore, a display distance between right and left images of an infinite subject should be displayed to be equal to an interpupillary distance size of a human even in a stereoscopic television.

It is said that a standard size of an interpupillary distance of a human is 63.5 mm. However, this size is obtained by converting 2.5 inches of English size to a metric size (2.5×25.4=63.5 mm), and though it is thought that the standard size is in a range from 65 to 66 mm, the standard size is set to be in a range of 65±65×0.1≈(58−72) 58−72 because it is thought that there is a difference of ±10% among individuals. In fact, adjustment of an interpupillary distance between eye pieces of commercially-available binoculars is set in a range from 60 to 70 mm.

Figure 2:
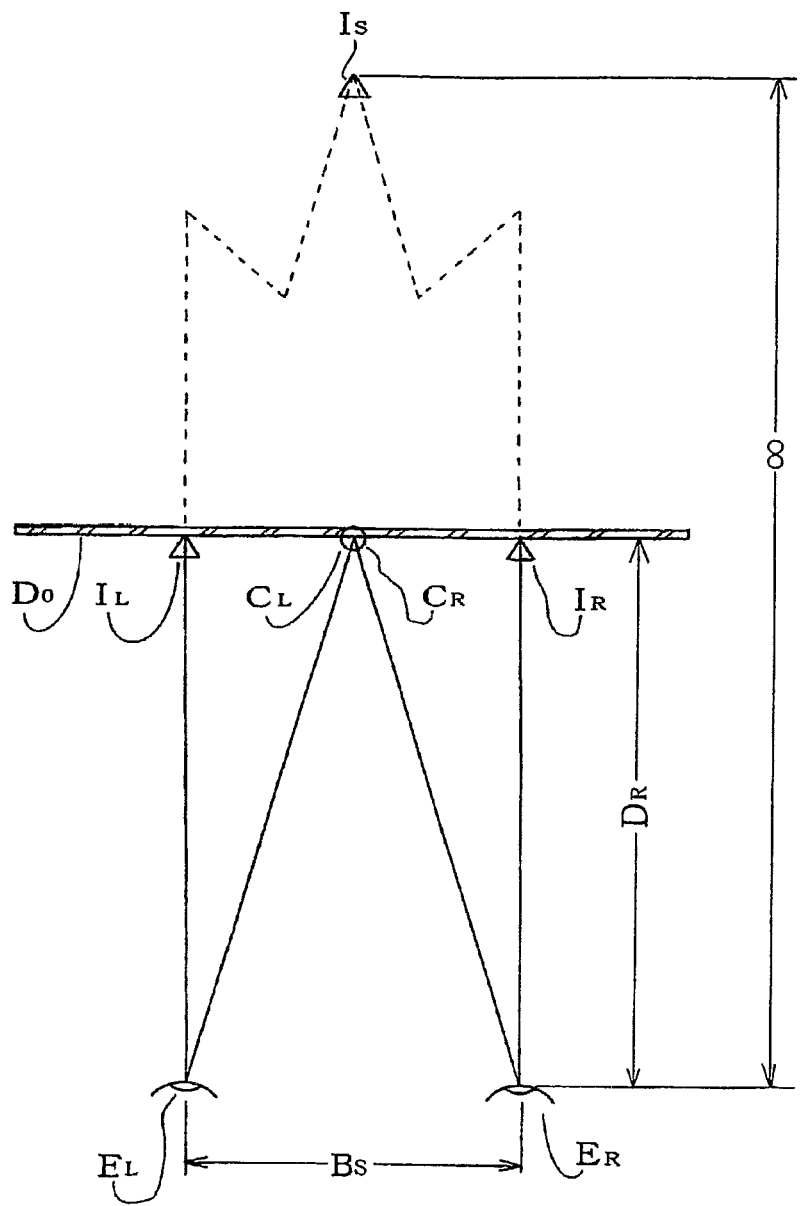
FIG. 2 is an explanatory diagram of a stereoscopic television where right and left images are displayed at the same, or one, position on a display in a superimposing manner.

FIG. 2 shows a state of a stereoscopic viewing. In FIG. 2, screens for the right and the left of a stereoscopic image are displayed such that the centers thereof are caused to coincide with each other on a display $D_0$. Display is performed in this state such that right and left images $C_L$ and $C_R$ of a subject positioned at the nearest distance are superimposed at the same, or one, position (see Japanese Unexamined Patent Application Publication No. 2006-303832 and Japanese Unexamined Patent Application Publication No. 2006-254074). Simultaneously therewith, in the case that a distance between right and left images $I_L$ and $I_R$ of an infinite subject are displayed to be equal to an interpupillary distance Bs of a human, regarding a range where a viewer can see an object positioned at a far distance and an object positioned at a near distance simultaneously in a fusing manner when a human sees an actual object stereoscopically, it is said to be proper according to examination of a proper viewing distance that a near distance is 30 times to 50 times an interpupillary distance, when a far distance is defined as an infinite point.

In the case that the interpupillary distance is defined as Bs=65 mm,

Bs×30=65×30=1950 mm, about 2 meters is obtained in the case of 30 times, while Bs×50=65×50=3250 mm, about 3.5 m meters are obtained in the case of 50 times.

In stereoscopic viewing, a viewing distance of 3.5 meters is a distance where fusing of right and left viewing fields can be made considerably easy, and a distance of 2 meters is an approximately limit value. Therefore, when a distance between the right and the left of an infinite image is displayed to be equal to the interpupillary distance Bs, a short-range subject distance for performing display (for causing right and left viewing fields to coincide with each other)at the same, or one, position (in a horizontal direction) on a display, namely, a recommended viewing distance (illustrated $D_R$) for viewing the display is a distance where a virtual window where display screens for the right and the left coincide with each other to appear like one window, namely, "stereo window" appears.

The abovementioned $D_R$ can be set in a range from 2 to 3.5 meters, but when the recommended viewing distance $D_R$ is set to be considerably small, not only stress occurs in stereoscopic viewing but also a phenomenon where a display itself appears small occurs (though concealing is not performed). When the recommended viewing distance $D_R$ is set to be large, an opportunity where an object(s) positioned within a distance range shorter than the recommended viewing distance $D_R$ comes out on a photographing side (the object(s) may come out as an additional sight(s) without intending to photograph the object(s)) increases. That is, such a case that an object(s) positioned within a distance range shorter than the recommended viewing distance $D_R$ come(s) out within a viewing field at a viewing time. In such a case, screens for the right and the left (picture frames) often appear double in a deviating manner (especially, since not only a display itself appears in a deviated manner from its normal position on a television, but also the influence of the deviation spans the situation of the surrounding area of the television, attention must be paid to the deviation). In view of these circumstances, it is considered proper that the recommended viewing distance $D_R$ is about 2.5 meters, but the recommended viewing distance $D_R$ should be determined in consideration of a size of a room in which a television is placed or the like.

When a distance between right and left images of an infinite subject is set to be equal to the interpupillary distance Bs, a display size (screen width) is not limited to a specific one, but it is desirable that the display size is at least 20 times the interpupillary distance Bs.

When the screen width is represented as W, because of Bs=65, W=65×20=1300 mm, namely, the screen width W becomes about 1300 mm.

On the other hand, when a horizontal viewing angle of view (an angle between line segments connecting both ends of a display and a pupil) is represented as β, β≈40° is ideal in order for a viewer to see a screen as a powerful large screen.

When the horizontal viewing angle of view is represented as β, the recommended viewing distance is represented as $D_R$, and a reference screen width (reference size) is represented as $W_0$, $W_0 = 2D_R \cdot \tan(\beta/2)$ is obtained.

If the recommended viewing distance $D_R$=2500, $W_0$=2×2500×tan (40/2) is obtained. Because of tan 20°=0.363970232, $W_0$=2×2500×0.36397≈1800 mm is obtained. Therefore, a display having a width of 1800 mm is required. Incidentally, when an aspect ratio of a display is 3:4, a length ratio of an oblique line (a diagonal line) becomes 5, so that an actual size of the oblique line requires 1800×5/4=2250 mm, namely, 2250/25.4=88.58 inches, about 90 inch size.

From the above, when stereoscopic television broadcasting is implemented, transmission should be made such that right and left images of an infinite subject are equal to an interpupillary distance size of a human and right and left images of the nearest subject are disposed at the same, or one, position in a superimposing manner. Even when the same, or one, broadcasting wave is received in receivers whose screen sizes are different from a reference size, individual receivers should be set such that a display distance of right and left images of an infinite subject is displayed to be equal to the interpupillary distance size Bs of a human.

Figure 3:
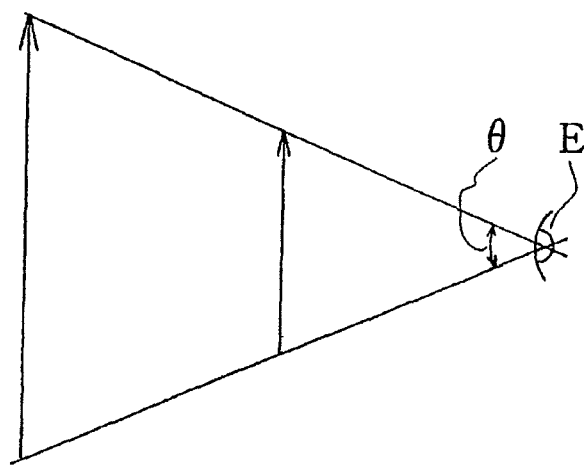
FIG. 3 is a state diagram where a person determines a size of an object.
Figure 4:
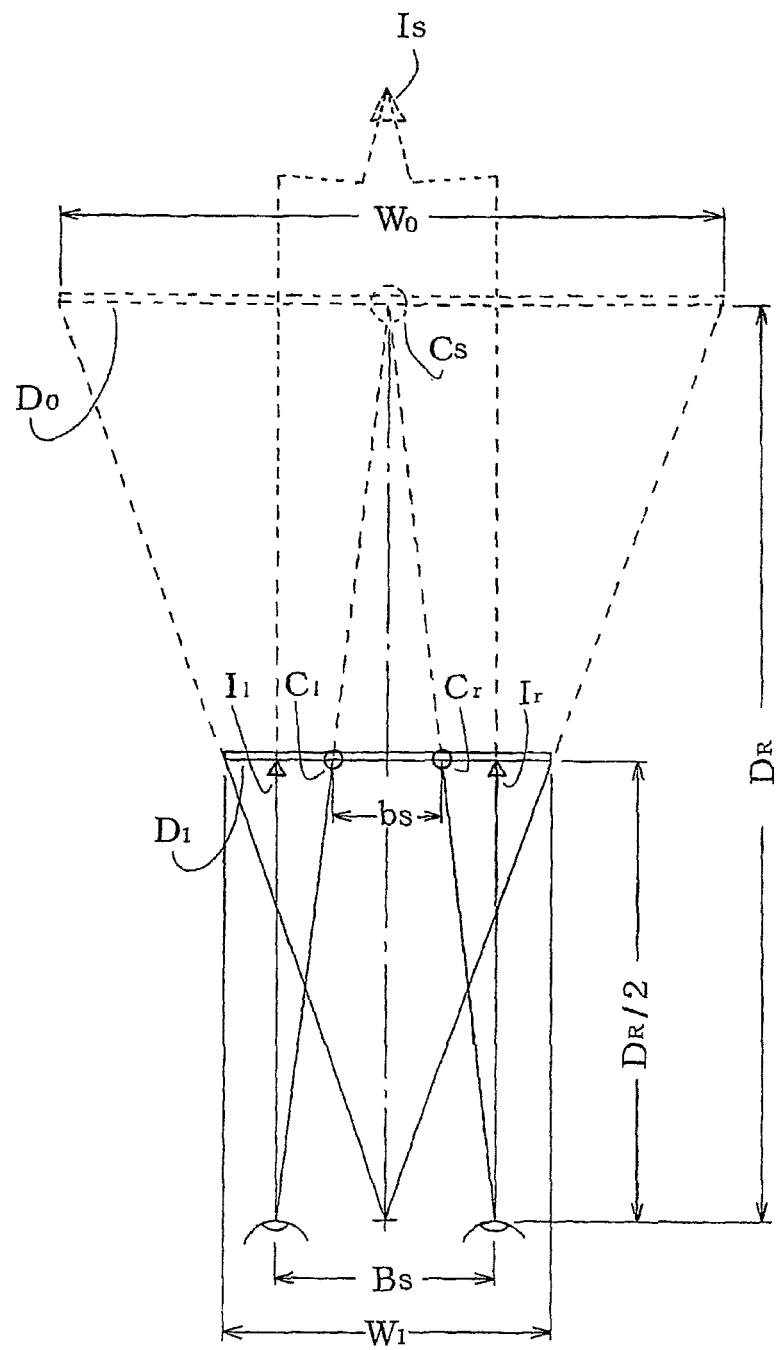
FIG. 4 is an explanatory diagram of a stereoscopic television which uses a display with a size smaller than a reference size but appears like a screen with a reference size.

FIG. 3 is a state diagram where a human determines a size of an object, where, when illustrated viewing angles θ are equal to one another, apparent sizes of objects appear equally. Regarding objects having the same size, one closer to eyes of a human appears larger. In FIG. 4, therefore, a display $D_0$ with a standard size and a display $D_1$ with a width of ½ which is put at a position at ½ of the distance of the display $D_0$ appear to have the same size apparently. That is, a display with a width of $W_0$=1800 mm seen at a distance of 2.5 meters and a display with a width of $W_1$=900 mm seen at a distance of 1.25 meters appear to have the same size. When the display $D_0$ is replaced by the display $D_1$, a size of an image is displayed in a proportionally reduced size, but sizes of apparent images on the displays become the same because a reduction ratio and a ratio of viewing distances are equal to each other. Even in a stereoscopic television using a relatively narrow width display, a viewer can see a stereoscopic image with a size equal to that of an image on a stereoscopic television with a wide width in this manner. Even in this case, when a distance between the right and left images of an infinite subject is displayed to be equal to an interpupillary distance of a human, the respective right and left images of the infinite subject enter the respective right and left eyes of a viewer parallel.

In FIG. 4, in an example where the display $D_1$ with a width of ½ of 1800 mm which is the width of the display $D_0$ with the reference size is used, an image displayed on the display $D_1$ is also displayed in a proportionally-reduce manner, so that a distance between right and left images of an infinite subject which is equal to the interpupillary distance Bs on the display $D_0$ is originally proportionally reduced to ½ to be displayed to be a distance of Bs/2=bs illustrated. When the respective right and left images are wholly moved in order to display a distance between right and left images of an infinite object as a size of Bs which is equal to an interpupillary distance on a display with a narrow width, as illustrated, the centers of screens for right and left are separated from each other by an amount of Bs/2=b. Accordingly, right and left images ($C_L$ and $C_R$ in FIG. 2) of a subject positioned at the shortest distance, which should be displayed at the same, or one, position on the display $D_0$ with the reference size in a superimposing manner are displayed at the respective positions of the $C_l$ and $C_r$ illustrated in FIG. 4 on the display $D_0$ so as to be separated by a distance of b. In FIG. 4, images $I_l$ and $I_r$ of an infinite subject are displayed on the display $D_1$ so as to be separated by a distance equal to the interpupillary distance $B_s$, and right and left images $C_l$ and $C_r$ to appear at the same, or one, position on the display $D_0$ in a superimposing manner are displayed so as to be separated by a distance bs, so that the images $C_l$ and $C_r$ appear equally to the case that the display $D_0$ has been placed at a position of 2.5 meters when they are stereoscopically viewed from a distance of 1.25 meters.

Figure 5:
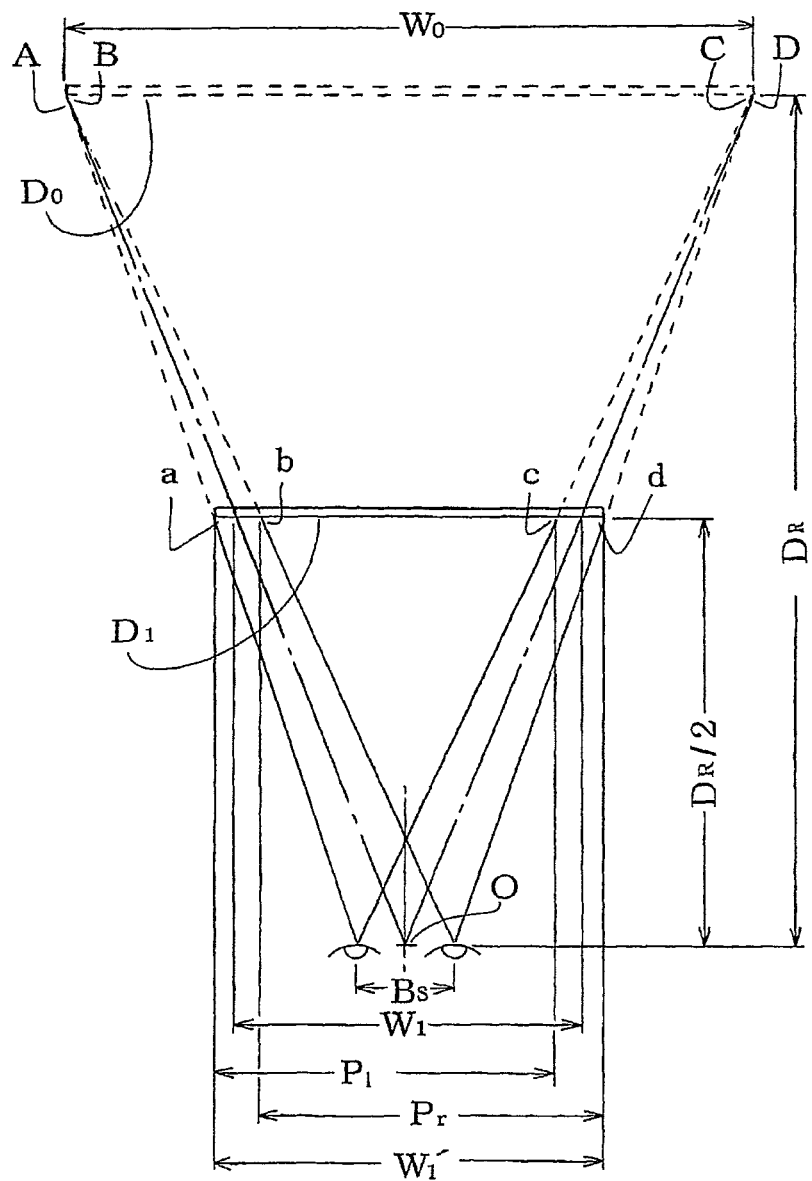
FIG. 5 is a state diagram of screen correction when a display with a size smaller than a reference size is used.

However, reduction of the display size has a problem. FIG. 5 is a state diagram of a stereoscopic viewing, where, when transmission signals which have been adjusted such that an image for the left appears between points A and C on the display $D_0$ with the reference size, while an image for the right appears between points B and D are displayed on the illustrated display $D_1$, setting must be performed such that an image $P_l$ for the left appears between points "a" and "c" while an image $P_r$ for the right appears between points "b" and "d". Therefore, it is necessary to display the image for the left in black (perform non-display) between the illustrated points "c" and "d" and the image for the right in black between the illustrated "a" and "b". In FIG. 5, lines (dashed-dotted lines illustrated in FIG. 5) connecting both ends of the display $D_0$ with the reference size and the center O of the viewing point pass through an intermediate point between the points "a" and "b" and an intermediate point between the points "c" and "d" on the display $D_1$ positioned at a distance of ½ of the recommended viewing distance $D_R$, and the length of the display $D_1$ defined by the right and left dashed-dotted lines is a size of ½ of the display $D_0$ which is an illustrated $W_1$, but an actual display must be extended up to the point "a" and point "d" illustrated by $W_1'$. As illustrated, the extended amount reaches Bs/2 in sum of the right and the left. A concealing (black display) amount for each of the range from the point "c" to the point "d" of the screen for the left and the range from the point "a" to the point "b" of the screen for the right becomes Bs/2.

Figure 6:
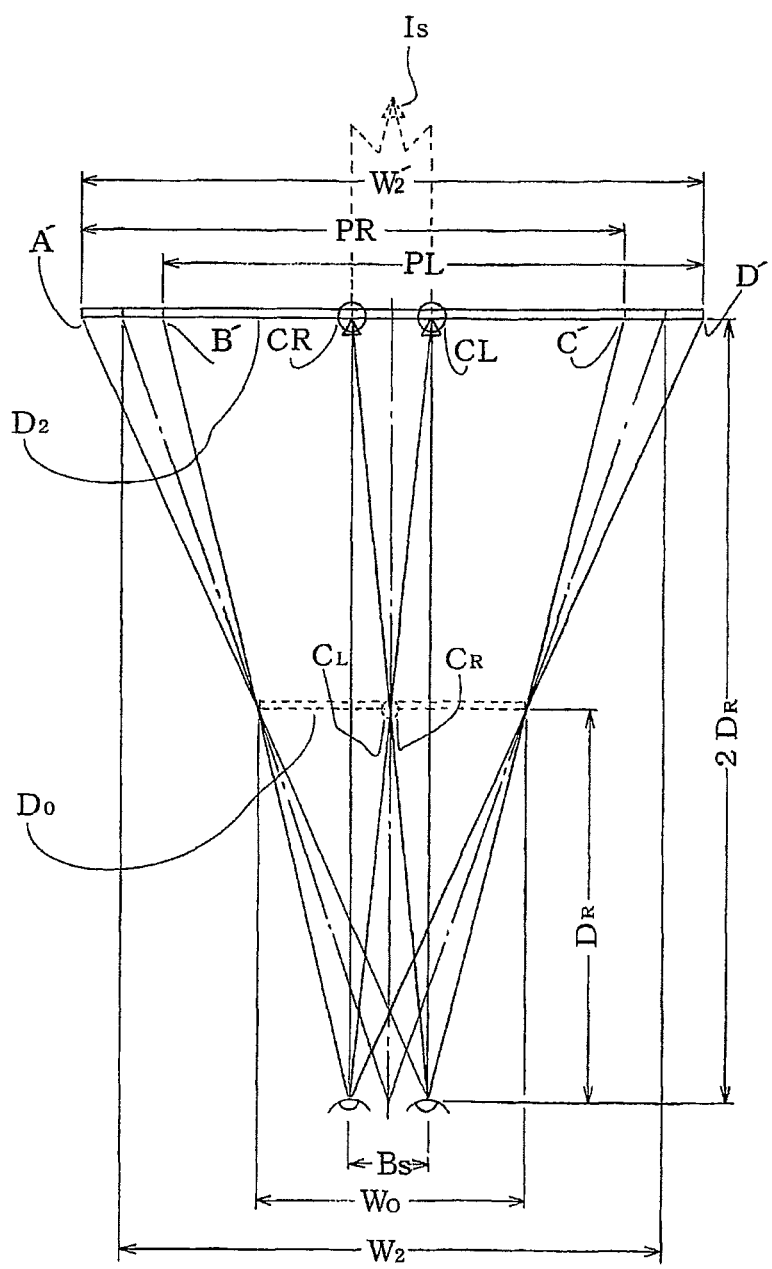
FIG. 6 is an explanatory diagram of a stereoscopic television using a display with a size larger than a reference size.

Contrary to the above, for example, as shown in FIG. 6, right and left images of an infinite subject should be set to a width of Bs which is a size equal to an interpupillary distance of a human even when a stereoscopic image transmitted with a width $W_0=1800$ mm of the reference display $D_0$ and the recommended viewing distance $D_R=2.5$ meters is viewed on a display $W_2=3600$ mm having a double width at 5 meters which is two times the viewing distance $D_R$. Even in this case, the image is proportionally enlarged according to the screen size but the viewing distance is also enlarged proportionally, so that the image appears like the state that a viewer has seen the reference size display $W_0$ from the distance of the recommended viewing distance $D_R=2.5$ meters. However, setting must be performed such that the image PL for the left illustrated in FIG. 6 appears in a range from the point B' to the point D' while the image PR for the right illustrated in FIG. 6 appears in a range from the point A' to the point C'. Therefore, regarding the screen for the left, the range from the point A' to the point B' must be concealed (displayed in black) and regarding the screen for the right, the range from the point C' to the point D' must be concealed (displayed in black). As apparent from FIG. 6, when a display with a size larger than the reference size is used, for example, when a width is expanded to two times, a wider display $W_2'$ with a size obtained by adding an interpupillary distance size $B_S$ to a size of two times the width $W_2$ of the display $D_2$ with the reference size is required.

In FIG. 6, subject images $C_L$ and $C_R$ at the shortest photographing distance which should be displayed on the display $D_0$ with the reference size at the same, or one, position for the right and the left in a superimposing manner appear at positions of CL and CR on the display $D_2$ with the expanded size, respectively, and the images for the right and the left switch positions with each other, but short-range right and left images in stereoscopic viewing intersect at a virtual position of the display $D_0$ with the reference size to appear natural as if a viewer was seeing the display $D_0$ with the reference size from the recommended viewing distance $D_R$.

When a reference display size is determined, a television for receiving stereoscopic broadcasting must conceal (display in black) a portion of a screen even when a width of a display actually used is larger than the reference size or when it is smaller. Therefore, it is necessary to make examination from more factors in order to determine numerical values for the reference size $W_0$ and the recommended viewing distance $D_R$. This is because an average number of persons who watch television, a size of a room where a television is installed or the like in popular families are important factors in order to determine the display size or the recommended viewing distance.

Figure 7:
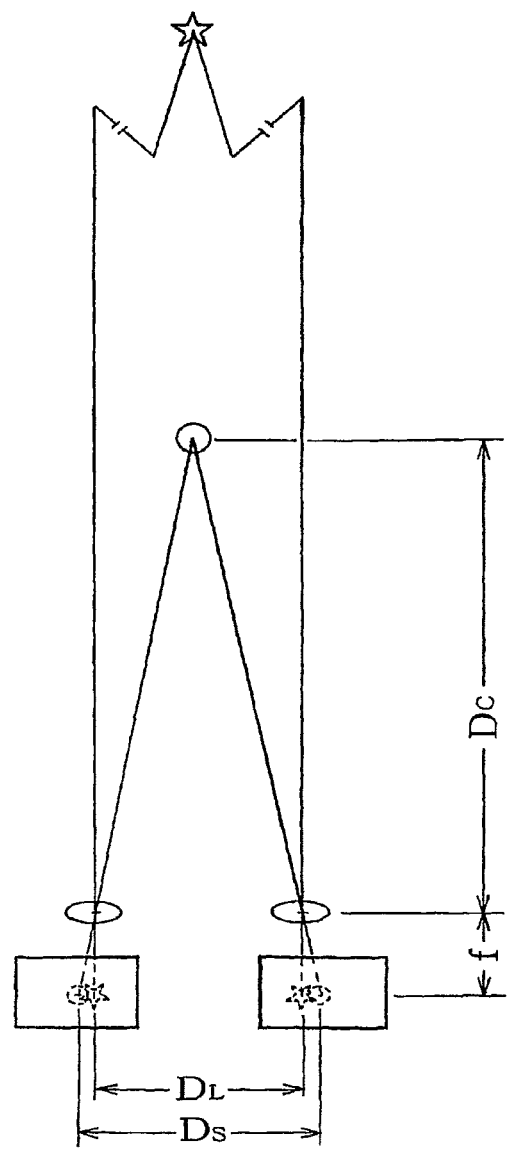
FIG. 7 is an explanatory diagram of a stereo camera for photographing a stereoscopic image.

FIG. 7 shows one embodiment of a TV camera applied when stereoscopic television broadcasting is implemented, where because light beams which enter right and left photographing lenses from an infinite subject are in parallel with each other, a distance between infinite images projected on right and left imaging elements become equal to a distance between right and left photographing lenses. When a distance between right and left lenses (lens distance) is represented as $D_L$, a distance between right and left photographing elements (sensor distance) $D_S$ is determined in the following manner.

When a distance $D_C$ where right and left viewing fields coincide with each other on the photographing elements, a projection ratio to a distance in an illustrated example is $r=f/D_C$, and the sensor distance Ds becomes $D_s=D_L+D_L \cdot r$.

In the state determined by the above mathematical expression, images projected on the respective right and left photographing elements may be transmitted to be displayed on the respective right and left screens on the side of the receiver.

In the camera shown in FIG. 7, when a subject is positioned farther than the illustrated distance $D_C$, the positional relationship between the photographing lenses and the photographing elements may be a constant relationship illustrated (focal points of the lenses must be adjusted but explanation about the adjustment is omitted), but when an object positioned nearer than the distance $D_C$ enters a viewing field for photographing, an image of the object appear to pop up from the screen, and right and left picture frames appearing as one frame in stereoscopic viewing appear double so that a viewer feels stress: Therefore, an object (s) positioned in a distance nearer than the recommended viewing distance (equivalent in viewing on the side of the receiver) must be generally prevented from entering a photographing viewing field.

Incidentally, most of the TV cameras are provided with a zoom lens. In a state for performing zooming, the relationship of $D_s=D_L+D_L \cdot r$ is satisfied, and the sensor distance and the lens distance are constant, so that the illustrated $D_c$ is determined according to the projection ratio r. It is necessary to make the projection ratio r constant in order to make the lens distance and the sensor distance constant in zooming. Since the projection ratio lies in the relationship of $r=f/D_C$, the illustrated distance $D_C$ varies according to zooming operation.

That is, "stereo window" is set to a near position on a Wide (W) side where a focal length is small, while it is set to a far position on a Tele (T) side where the focal length is long.

The above will be more specifically explained. As one example, when an width of an photographing element of a camera photographing a stereoscopic image for a stereoscopic television with a width $W_0=1800$ mm of a reference size display $D_0$ and a recommended viewing distance $D_R=2500$ mm is 18 mm and a focal length of a photographing lens is 25 mm, a width of a photographing element becomes 1/100 of the width of the display. Now, on the contrary, assuming that a television is an actual scene, a window having a width of 1800 mm is existent, a state equal to a state of photographing the window from a distance of 2500 mm can be obtained. In this case, regarding a lens having a focal length of 25 mm, a photographing ratio thereof to a photographing distance of 2500 mm becomes 1/100. 65 mm which is a difference between a distance between infinite images on the display with a width of 1800 mm and a distance between images of a near view (right and left images of a near view are superimposed at the same, or one, position on the reference display $D_0$) becomes a difference of 65/100 mm because the photographing ratio on the photographing element with a width of 18 mm is 1/100. Accordingly, when the lens distance $D_L$ is 65 mm, the sensor distance $D_S$ becomes $D_S = D_L + D_L \cdot r = 65 + 65/100 = 65.65$ mm.

If the camera has a zoom lens and a focal length is set to 100 mm, the illustrated $D_C$ where the photographing ratio becomes 1/100 becomes 100/0.01=10000=10 meters. That is, the stereo window is set at a position of 10 meters. In fact, however, the stereo window does not appear on the display at a position of 10 meters, but an object at the position of 10 meters is expanded to appear to exist at the position of 2.5 meters. Similarly, when the focal length of the photographing lens is set in a shorter direction, for example, to 10 meters, the distance of the illustrated $D_C$ where the photographing ratio r becomes 1/100 becomes 10/0.01=1000=1 meter. An object at the position of 1 meter appears at the position of 2.5 meters. Thereby, such a merit can be obtained that a photographer can come close to an object up to 1 meter from the object even in a place narrow in an anteroposterior direction.

As described above, a set distance of "stereo window" automatically varies according to zooming at a photographing time, but attention should be paid such that an object positioned nearer than the stereo window does not enter a viewing field at a photographing time. In a conventional stereo camera, however, since it is impossible for a photographer to confirm the set distance of the stereo window with his/her eyes, the set distance must depend on the intuition of a photographer or an editor. However, in cameras disclosed in Japanese Unexamined Patent Application Publication No. 2006-303832 and Japanese Unexamined Patent Application Publication No. 2006-254074 which has been already proposed by the present applicant, since a set distance of the stereo window can be confirmed with eyes of a photographer according to a collimation pattern of a finder, an optimal photographing state can be always maintained even if a zoom lens is used or even if lens replacement is freely performed.

As the stereo cameras, there are a hyper stereo camera where a distance between optical axes of right and left lenses is considerably increased from a standard distance and a micro stereo camera where the distance is reduced from the standard distance. Since light beams emitted from an infinite distance to enter right and left photographing lenses are parallel with each other even in the hyper stereo camera, a distance between image points captured at the centers of the respective right and left lenses can be displayed to be equal to an interpupillary distance of right and left eyes of a human at a viewing time.

There is such a case that only a relatively short-range subject is photographed using a standard stereo camera. In such a case, such a problem arises that a distance between the centers of whole images projected on photographing elements increases so that right and left viewing fields do not fuse completely. The present applicant has already proposed a method for solving this problem. The method is configured such that ranges slightly narrower than whole widths of photographing elements are always read out and used, and when a photographing distance is small, scroll adjustment is performed such that reading ranges of the right and left photographing elements are positioned outwardly to each other. The adjustment state is confirmed with eyes of a photographer through a monitor of the camera (see Japanese Unexamined Patent Application Publication No. 2006-303832 and Japanese Unexamined Patent Application Publication No. 2006-254074). Incidentally, when only a short-range subject appears in a macro photographing or the like, the farthest point within the viewing field should be handled as an infinite point.

Embodiment described in claim 5: A light beam emitted from an LCD panel is a polarized light whose amplitude direction is constant. When polarizing plates orthogonal in direction to a polarizing plate on a surface of the LCD panel are attached to the respective right and left of the glasses and a viewer sees the LCD through the glasses, the viewing fields of both the right and left of the glasses become closed. When liquid crystal plates twisted at 90° or 270° are attached to front faces of the left and the right of the glasses, the polarized light from the LCD is oriented at an angle of 90° or 270° by the liquid crystal so that both the right and left viewing fields become opened, falling in a crosstalk state (see like the case that the glasses are not used). When a voltage is applied to the liquid crystal plates on the glasses, the liquid crystal is stressed from the twisted state to a linear state, the glasses become equal to a state that the liquid crystal plates have been removed from the glasses so that the right and the left viewing fields become closed. Therefore, if images for the right and the left are displayed on the LCD alternately in a time-division manner and synchronous signals are simultaneously emitted by infrared rays, and the right and left viewing fields are alternately opened and closed while voltages applied to the liquid crystal plates of the glasses are synchronized with the infrared rays, the right and left viewing fields can be separated from each other.

Though the abovementioned method is based upon the same principle as the method which has been already implemented for the CRT or the PDP, an emitted light beam is not polarized light in the CRT, the PDP, or the like, so that it is necessary to provide another polarizing plate on a front face of the glasses. When the glasses are inclined to the display, the right and left viewing fields causes light leakage in the linear polarization, resulting in crosstalk. Recently, a circularly-polarizing filter is used in order to prevent crosstalk, but a λ/4 filter is used in the circularly-polarizing filter so that there is such a problem that a price of the circularly-polarizing filter is high (since the λ/4 filter is made of a polymer film recently, it is not said necessarily that the price is high) and there is bias in wavelengths of transmitted lights.

If an inclination angle sensor is attached to polarizing glasses in order to solve the abovementioned various problems so that a voltage applied to liquid crystal plates of the glasses is controlled according to an inclination angle of the glasses, a viewing field state at a closed time is completely put in a concealed state even when the glasses are inclined so that occurrence of crosstalk can be prevented.

Industrial Applicability

As described above, a stereoscopic television system, a stereoscopic television receiver, and glasses for stereoscopic image viewing according to the present invention are suitable for recording, reproducing and displaying a stereoscopic image photographed by a stereo video camera and for stereoscopic television broadcasting.

What is claimed is:

1. A stereoscopic television receiver wherein a display with a width narrower than that of a display with a reference size is used, black non-display portions are provided on a right end portion of a display screen for left and a left end portion of a display screen for right, respectively, and displaying is performed such that widthwise centers of the display screens for right and left are displaced on the display in directions away from each other, so that a right viewing field and a left viewing field are caused to coincide with each other at a position far from a surface of the display and a distance between the right and the left of the same corresponding points on an infinite subject image is displayed to be equal to an interpupillary distance of a human.

2. A stereoscopic television receiver wherein a display with a width wider than that of a display with a reference size is used, black non-display portions are provided on a left end portion of a display screen for a right and left end portion of a display screen for right, respectively, and displaying is performed such that widthwise centers of the display screens for right and left are displaced on the display in directions in which the centers come close to each other and further in directions in which the centers switch positions with each other so that a right viewing field and a left viewing field are caused to coincide with each other at a position before the display and a distance between the right and the left of the same corresponding points on an infinite subject image is displayed to be equal to an interpupillary distance of a human.

3. A stereoscopic television corresponding to and utilizing photographing images from a stereo camera comprising:

a stereoscopic television transmitting and receiving system wherein images for right and left of a stereoscopic image are displayed in a superimposing manner on a display with a reference size which is received at a receiver side, so that, the same corresponding points on an infinite subject image is displayed to a distance of an interpupillary distance of a human, a stereoscopic television receiver used for the stereoscopic television transmitting and receiving system of a two eyes stereoscopic viewing system where images for right and left photographed from two separated points are viewed while separated for respective right and left eyes of a human, a stereoscopic liquid crystal display television receiver wherein a display with a width narrower than that of a liquid crystal display with a reference size is used, black non-display portions are provided on a right end portion of a display screen for left and a left end portion of a display screen for right, respectively, and displaying is performed such that widthwise of the display screens for right and left are displaced on the display in directions away from each other, so that a right viewing field and a left viewing field are caused to coincide with each other at a position far from 2 m to 3.5 m of an observer, and a distance between the right and the left of the same corresponding points on an infant subject image is displayed between 58 mm to 72 mm which is equal to an interpupillary distance of a human.

* * * * *